US007339608B2

(12) United States Patent
Ryley et al.

(10) Patent No.: US 7,339,608 B2
(45) Date of Patent: Mar. 4, 2008

(54) WIRELESS MOTION SENSOR USING INFRARED ILLUMINATOR AND CAMERA INTEGRATED WITH WIRELESS TELEPHONE

(75) Inventors: Gordon Ryley, Calgary (CA); Ralph Tischler, Surrey (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 778 days.

(21) Appl. No.: 10/395,153

(22) Filed: Mar. 25, 2003

(65) Prior Publication Data

US 2004/0130624 A1 Jul. 8, 2004

Related U.S. Application Data

(60) Provisional application No. 60/437,745, filed on Jan. 3, 2003.

(51) Int. Cl.
*H04N 7/18* (2006.01)
*H04M 1/00* (2006.01)

(52) U.S. Cl. .................................... 348/155; 455/556.1

(58) Field of Classification Search ............. 455/556.1, 455/550.1, 462, 566; 340/539.1, 539.11, 340/539; 348/152–155

See application file for complete search history.

(56) References Cited

U.S. PATENT DOCUMENTS

| | | | | |
|---|---|---|---|---|
| 6,433,683 | B1 | 8/2002 | Robinson | |
| 6,476,858 | B1 | 11/2002 | Diaz et al. | |
| 6,970,183 | B1 * | 11/2005 | Monroe | 348/143 |
| 2001/0008415 | A1 * | 7/2001 | Park | 348/143 |
| 2002/0118107 | A1 | 8/2002 | Yamamoto et al. | |
| 2003/0215141 | A1 * | 11/2003 | Zakrzewski et al. | 382/190 |
| 2004/0203366 | A1 * | 10/2004 | Tischler et al. | 455/41.2 |

FOREIGN PATENT DOCUMENTS

| | | |
|---|---|---|
| EP | 1 171 857 | 1/2002 |
| JP | 8153292 | 6/1996 |
| JP | 2001 053905 | 2/2001 |
| JP | 2002 230654 | 8/2002 |
| WO | WO 02/085019 | 10/2002 |
| WO | WO 03/009601 | 1/2003 |

OTHER PUBLICATIONS

International Search Report dated Apr. 28, 2004.

* cited by examiner

*Primary Examiner*—William J. Deane, Jr.
(74) *Attorney, Agent, or Firm*—Paul Hastings Janofsky & Walker, LLP

(57) ABSTRACT

An integrated camera, motion detector and cordless telephone system. A wireless camera operates to detect motion and then alerts a user to the motion via a base station/cordless handset. In one embodiment, the camera then also transmits still or streaming video to the base station/cordless telephone. Accordingly, a user can monitor image(s) via a cordless telephone handset and/or be alerted of motion within the camera's field of view.

24 Claims, 2 Drawing Sheets

WIRELESS MOTION SENSOR USING INFRARED ILLUMINATOR AND CAMERA INTEGRATED WITH WIRELESS TELEPHONE

This application claims the benefit of U.S. Provisional Application No. 60/437,745, filed Jan. 3, 2003, which is herein incorporated by reference in its entirety

BACKGROUND

1. Field of the Invention

The present invention is directed to wireless monitoring, and more particularly to a monitoring system that is, at least in part, integrated with a cordless telephone system.

2. Background of the Invention

With a perceived need for increased security and surveillance, many homeowners have installed alarm systems, including some with passive infrared motion sensors. Examples of known alarm/monitoring systems include the following.

(1) "CyberEye" is a device that senses motion and takes a still picture. The picture is then viewed by connecting the device to an external TV monitor or VCR. This system supports a black and white picture only and uses infrared illumination. More information about this product can be found at http://nservices.com/cybereye.htm.

(2) "VisionTech VT12WP" is a system that employs a 2.4 GHz high power wireless video camera that requires line of sight between the camera and receiver. This system is particularly suited to commercial applications and, in comparison to systems with similar functionality, is very costly. More information about this product can be found at http://www.visiontechintl.com/pdf/vt12wp.pdf.

(3) "TBO-Tech ST-103W" is a system that uses a passive motion detector that is wired to a separate 2.4 GHz wireless camera and receiver. The receiver also must be connected to an external TV or VCR to view images. More information about this product can found be at http://www.hiddenpinholecameras.com/motion-detector.htm.

Other known monitoring systems are described in U.S. Pat. No. 6,476,858, "Video Monitoring and Security System," and U.S. Pat. No. 6,433,683, "Multipurpose Wireless Video Alarm Device and System."

Despite the availability of a wide variety of monitoring systems as exemplified by the products and systems mentioned above, there is still a need for improvements in this field of technology.

SUMMARY OF THE INVENTION

The present invention provides, in one embodiment, a system in which motion is detected within a field of view of a camera unit. This data is then used to, wirelessly, using a wireless/cordless telephone system, notify a user, or trigger a sequence of events. For example, when motion is sensed, the camera unit is programmed to take a picture of the area under view and have it saved for later viewing. The camera can also be programmed to transmit streaming video. Preferably, the camera is sensitive to infrared light.

The present invention may be used, for example, as a motion detector in a baby monitor application to indicate (i.e., turn on a microphone, generate a chime, etc.) that a baby is active and awake.

The present invention may also be used, for example, as a motion detector in a video doorbell application to let a user know (e.g., by causing a doorbell to ring over the cordless phone) that someone is approaching the door.

In yet another application of the present invention, the motion detector is used to indicate (ring an alarm, take a picture, etc.) that an intruder has entered a secured room.

Features of the present invention include, but are not limited to:

(1) Using a cordless phone handset/base as an alarm for sensing motion;

(2) Using a cordless handset to view the area of motion; and (3) Viewing an area or detecting motion without visible light.

The features and attendant advantages of the present invention will be more fully appreciated upon a reading of the following detailed description in conjunction with the accompanying drawings.

DETAILED DESCRIPTION

A significant feature of the present invention is the integration of a wireless video camera and an easy-to-use and familiar wireless or cordless telephone system. With this integration, a user can not only be alerted to detected motion in an area of interest, but can also easily view the area of interest on the cordless telephone handset or base station display. Thus, the present invention provides a cordless telephone system with remote sensing capabilities.

When the present invention is used as a baby monitor, for example, the sensing of baby movement can be used to alert the parent who can then peer into the toddler's room using the camera to see the infant. By employing an infrared illuminator and camera sensitive to this type of light, it is not only possible to detect motion in the dark, but it is also possible to allow a caretaker to view a baby in a darkened setting.

When the present invention is used as a video doorbell, the user can be notified if someone is at the front door. The detection of motion can even be used to cause a snapshot to be taken of the front door area in, for example, the case of a break-in to help identify an intruder.

Significantly, by integrating a camera, motion sensor, and wireless unit into a cordless telephony system, it is no longer necessary to purchase separate devices that are often incompatible with one another, as is common in the prior art. More importantly, in accordance with the present invention, the camera and motion sensor are preferably integrated into a familiar cordless telephone system, making the entire system more user friendly.

In a preferred embodiment, an image in a camera's field of view is transmitted only upon a trigger caused by sensed motion. Consequently, the transmitter can significantly reduce power consumption by transmitting only when motion is detected. In the case of a baby monitor application or fixed surveillance operation application, extremely long battery life can thus be achieved for battery-operated camera (s) and handset components.

As explained above in the Background section, some systems use a separate passive IR sensor to detect motion and a separate camera for imaging. Many of these systems are wired (not wireless), and those that are wireless use separate transmitters for each component.

In contrast, an embodiment of the present invention uses a combination infrared illuminator and camera to detect motion in a field of view. Once motion is detected, a single integrated radio transmitter is used to notify the user and display an image using the wireless phone system. As explained previously, many other products either (a) use a wired connection to transmit the information and image or (b) must be connected to an external VCR or television to view the image. The present invention, on the other hand, is not so constrained.

Figure 1:
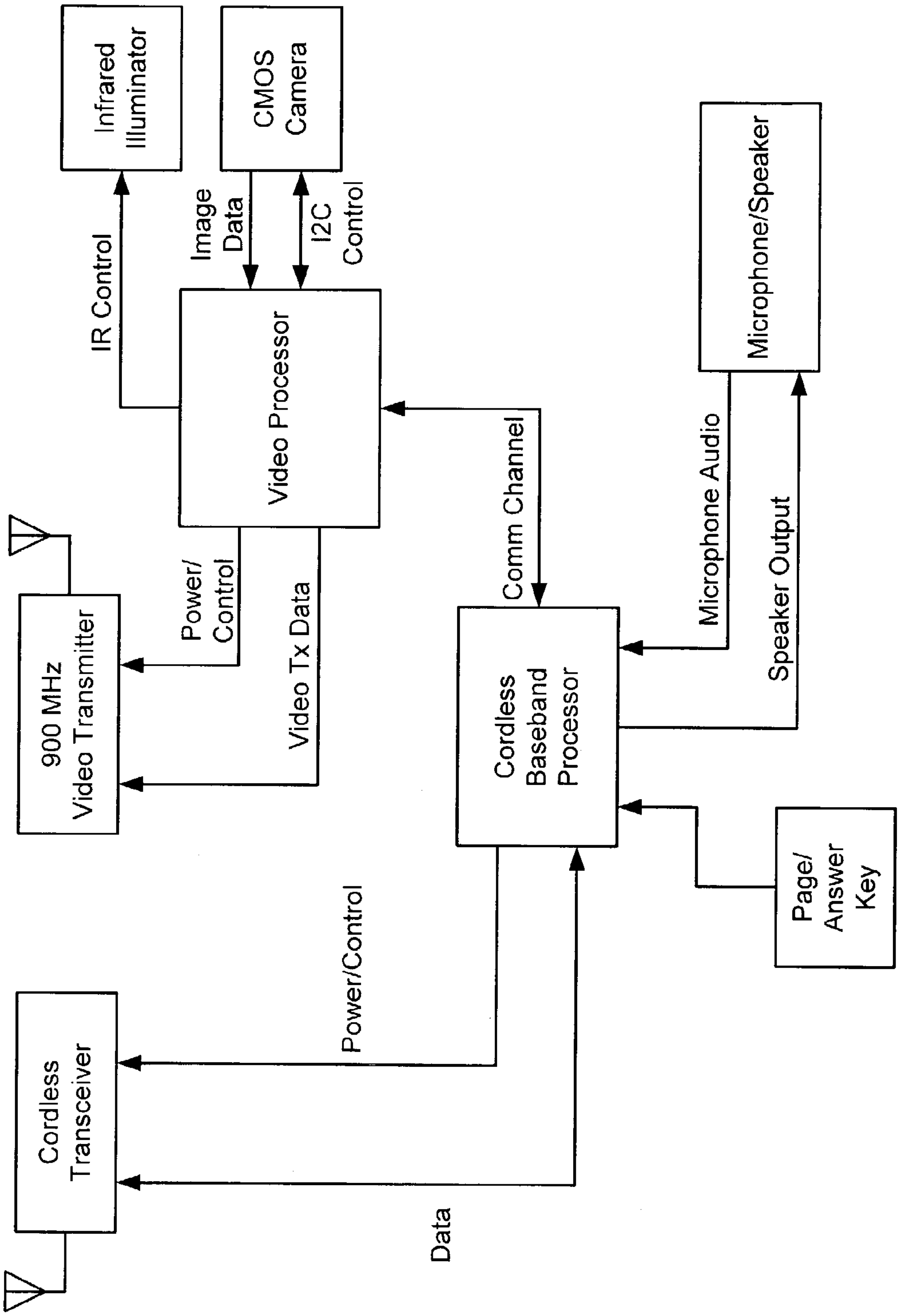
FIG. 1 depicts an exemplary arrangement for a wireless camera that operates in conjunction with a base station in a multi handset cordless telephone system.
Figure 2:
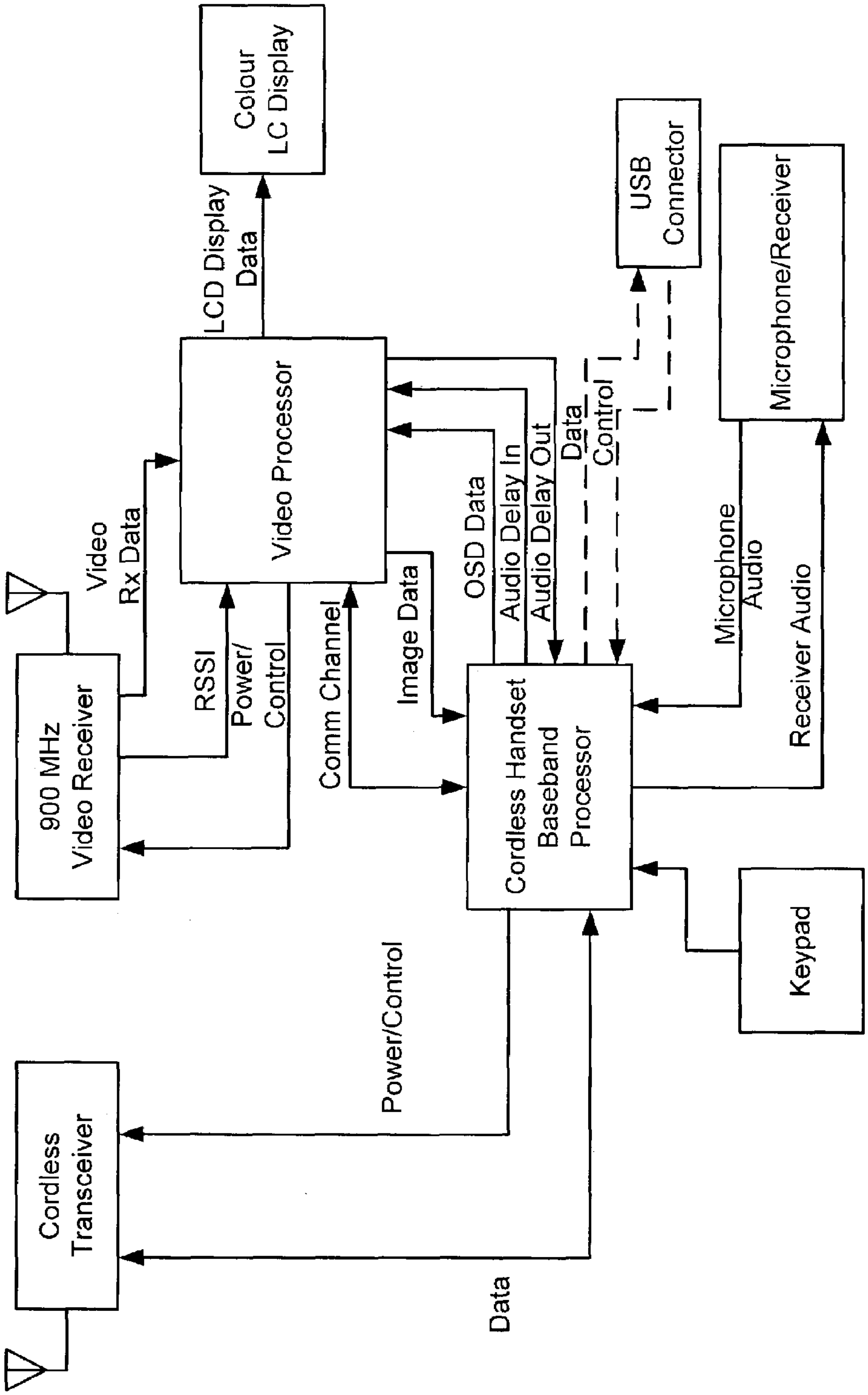
FIG. 2 depicts an exemplary arrangement for a cordless handset that operates in conjunction with a base station in a multi handset/camera cordless telephone system.

In accordance with preferred embodiments of the present invention, aspects of which are illustrated in FIGS. 1 and 2, a wireless telephone/video camera/motion sensor system comprises three major system components:

(1) Camera Unit;
(2) Base Unit; and
(3) Video Handset.

Sub-components of each of the foregoing components are listed below. It should be appreciated by those skilled in the art that while specific frequencies or digital modulation techniques may be listed, these are only exemplary and are not intended to limit the scope of the present invention.

The Camera Unit Preferably Comprises:

- CMOS imaging sensor
- Microphone
- Speaker
- infrared illuminator consisting of 6 or more infrared LEDs
- 900 MHz digital modulation transmitter for video
- microcontroller for video processing, transmitter control
- 2.4 or 5.8 GHz digital modulation transceiver for voice and control
- microcontroller for telephone processing and transceiver control
- power supply
- keypad to control functions The Base Unit Preferably Comprises:

- Microphone
- Speaker
- 2.4 or 5.8 GHz digital modulation transceiver for voice and control
- microcontroller for telephone processing and transceiver control
- power supply
- keypad to control functions The Video Handset Unit Preferably Comprises:

- Color LC display
- Microphone
- Receiver (speaker)
- 900 MHz digital modulation receiver for video
- microcontroller for video processing, receiver control
- 2.4 or 5.8 GHz digital modulation transceiver for voice and control
- microcontroller for telephone processing and transceiver control
- USB interface
- power supply
- Keypad Description of Operation In one embodiment, the camera unit preferably detects motion in its field of view by taking periodic samples of an image at various pre-defined points $(x_a,y_b)$ in the image. The samples are saved in memory between successive video frames and the samples in the same $(x_a,y_b)$ locations are compared. If motion is present in the image, then there will be differences between the samples of successive images. A video microcontroller (video processor) compares the samples and determines if sufficient differences exist to indicate motion.

To ensure that motion can be detected in low or no visible light conditions, an embodiment of the invention provides an array of infrared LEDs that is pulsed periodically during video sampling to illuminate the viewing area.

Once the video processor has determined that motion exists, it can then initiate any of the following exemplary procedures:

1. Notify the remote cordless handset/base using a 2.4 or 5.8 GHz cordless radio link;
2. Take a snapshot (freeze) picture of the area under view; and/or
3. Turn on the video transmitter to display live motion video.

If the cordless handset/base is notified of motion, the handset or base can sound an alarm using the integrated speaker/receiver, or activate the camera/microphone/speaker on the camera and set up a video/audio link.

If a snapshot is taken, the saved image can be transmitted to the cordless handset for viewing. The digital image can also be downloaded to a computer or other data-capable device using an optional integrated USB port on the handset.

Thus, as will be appreciated by those skilled in the art, the present invention provides the ability to, among other things, use a cordless phone handset/base as an alarm for sensing motion, use a cordless handset to view an area of motion, and view an area or detect motion even without visible light.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A monitoring system, comprising:

a camera unit comprising a cordless radio transceiver operable at a first frequency and a video transmitter operable at a second frequency;

a video cordless telephone handset comprising a cordless radio transceiver operable at the first frequency and a video receiver operable at the second frequency; and a base unit, the base unit being operable at the first frequency to be in, at least periodic, communication using a cordless radio transceiver to communicate with the camera unit and the video handset unit, and the camera unit being operable to detect motion and automatically transmit an alert, the alert comprising one of (i) a signal to cause the video cordless telephone handset to indicate that motion has been detected and (ii) a still image to at least one of the base unit and video handset, wherein the camera unit transmits streaming video only after receiving an activation signal from the video handset or the base unit, the activation signal being made in response to the alert.

2. The system of claim 1, wherein the camera unit is configured to transmit an image in its field of view only when motion is detected.

3. The system of claim 1, wherein the camera unit comprises a CMOS camera.

4. The system of claim 1, wherein the camera unit further comprises a means for illuminating with non-visible radiation.

5. The system of claim 1, wherein the camera unit further comprises an infrared illuminator.

6. The system of claim 1, wherein the camera unit comprises a video processor for detecting motion.

7. The system of claim 1, wherein the handset communicates directly with the camera unit wirelessly.

8. The system of claim 1, wherein the handset comprises an auxiliary connector.

9. The system of claim 8, wherein the auxiliary connector comprises a USB connector.

10. A monitoring system, comprising:

a camera unit including a video processor, the video processor being operable to compare successive images captured by the camera unit and determine whether motion has occurred, the camera unit further comprising a cordless radio transceiver operable at a first frequency to communicate with a base unit of a cordless telephone system, and a video transmitter operable at a second frequency; and a cordless telephone handset comprising a cordless radio transceiver operable at the first frequency to communicate with the base unit, and a video receiver operable at the second frequency, the handset further including a viewing screen being operable to receive an initial transmission from the camera unit subsequent to a determination by the camera unit that motion has occurred, wherein the initial transmission is in the form of at least one of (i) a notification alert and (ii) a still image, and wherein the camera unit transmits streaming video only after receiving an activation signal from the cordless handset or the base unit, the activation signal being made in response to the initial transmission.

11. The system of claim 10, wherein the camera unit comprises an illuminator that illuminates with non-visible light.

12. The system of claim 10, wherein the camera unit is configured to transmit an image in its field of view only when motion is detected.

13. The system of claim 10, wherein the camera unit comprises a CMOS camera.

14. The system of claim 10, wherein the camera unit comprises a video processor for detecting motion.

15. The system of claim 10, wherein the handset communicates directly with the camera unit wirelessly.

16. The system of claim 10, wherein the handset comprises an auxiliary connector.

17. The system of claim 16, wherein the auxiliary connector comprises a USB connector.

18. A monitoring system, comprising:

a wireless camera unit that includes an infrared illuminator and an imaging sensor capable of capturing infrared light, the wireless camera unit being operable to capture and transmit images and to detect motion, the wireless camera unit comprising a cordless radio transceiver operable at a first frequency and a video transmitter operable at a second frequency;

a base unit that is operable to wirelessly communicate with the wireless camera unit using a cordless radio transceiver at the first frequency; and a cordless handset comprising a cordless radio transceiver operable to wirelessly communicate at the first frequency with the base unit, and a video receiver operable at the second frequency, the handset capable of receiving images transmitted from at least one of the wireless camera unit and the base unit, wherein the camera unit transmits streaming video only after receiving an activation signal from the cordless handset or the base unit, the activation signal being made in response to an indication that the camera unit has detected motion.

19. The system of claim 18, wherein the camera unit is configured to transmit an image in its field of view only when motion is detected.

20. The system of claim 18, wherein the camera unit comprises a CMOS camera.

21. The system of claim 18, wherein the camera unit comprises a video processor for detecting motion.

22. The system of claim 18, wherein the handset communicates directly with the camera unit wirelessly.

23. The system of claim 18, wherein the handset comprises an auxiliary connector.

24. The system of claim 23, wherein the auxiliary connector comprises a USB connector.

* * * * *